(12) United States Patent
Kleine et al.

(10) Patent No.: US 10,495,133 B2
(45) Date of Patent: Dec. 3, 2019

(54) CAPTIVE BOLT AND RETAINER

(71) Applicant: THE BOEING COMPANY, Chicago, IL (US)

(72) Inventors: Melinda J. Kleine, Saint Charles, MO (US); Jesse N. Goodman, Maryland Heights, MO (US)

(73) Assignee: The Boeing Company, Chicago, IL (US)

( * ) Notice: Subject to any disclaimer, the term of this patent is extended or adjusted under 35 U.S.C. 154(b) by 337 days.

(21) Appl. No.: 15/206,997

(22) Filed: Jul. 11, 2016

(65) Prior Publication Data

US 2018/0010628 A1    Jan. 11, 2018

(51) Int. Cl.
    *F16B 41/00*    (2006.01)
    *F16B 35/06*    (2006.01)
    *F16B 33/00*    (2006.01)
    *F16B 23/00*    (2006.01)

(52) U.S. Cl.
    CPC ........ *F16B 41/002* (2013.01); *F16B 23/0015* (2013.01); *F16B 33/002* (2013.01); *F16B 35/06* (2013.01)

(58) Field of Classification Search
    CPC ........ F16B 21/10; F16B 21/12; F16B 41/002; F16B 35/06; F16B 45/00; F16B 39/10
    USPC ....... 411/221, 516, 530, 351, 999, 407, 400, 411/401, 119–121, 81, 91, 340; 81/436, 81/451; 403/353
    See application file for complete search history.

(56) References Cited

U.S. PATENT DOCUMENTS

| | | | | |
|---|---|---|---|---|
| 449,037 A | * | 3/1891 | Chapman | F16B 23/0015 411/406 |
| 470,507 A | * | 3/1892 | Risser | B60D 1/02 278/65 |
| 518,825 A | * | 4/1894 | Pelton | F16L 3/14 248/60 |
| 603,196 A | * | 4/1898 | May | B60D 1/02 278/65 |
| 1,453,913 A | * | 5/1923 | Burdick | B25B 27/0035 29/240 |
| 2,566,055 A | * | 8/1951 | Daderko, Sr. | F16B 23/0015 411/406 |
| 3,077,810 A | * | 2/1963 | Heidbrink | B60D 1/02 280/515 |
| 3,658,369 A | * | 4/1972 | Barnes | F16B 21/12 403/316 |
| 4,033,244 A | * | 7/1977 | Jacobson | B25B 15/001 411/399 |
| 4,526,071 A | * | 7/1985 | Post | B25B 15/007 411/407 |

(Continued)

*Primary Examiner* — Flemming Saether
(74) *Attorney, Agent, or Firm* — Sage Patent Group

(57) ABSTRACT

A fastener system includes a bolt and a retainer. The bolt has a first end and an opposing second end, wherein a recess having a predetermined shape is defined in the first end of the bolt. The retainer includes a first end having a predetermined shape configured to be inserted within the recess in the first end of the bolt and a second end configured to couple about the second end of the bolt. A method of fastening parts together with the fastener system includes inserting the first end of the retainer into the recess of the bolt, deflecting and/or rotating the retainer in a direction to bring the second end of the retainer into proximity with the second end of the bolt, and securing a nut to the bolt.

26 Claims, 8 Drawing Sheets

(56) References Cited

U.S. PATENT DOCUMENTS

| | | | | |
|---|---|---|---|---|
| 4,759,177 A | * | 7/1988 | Brazell | .................... F16G 15/06 |
| | | | | 24/339 |
| 5,172,601 A | * | 12/1992 | Siegrist | .................. B60N 2/233 |
| | | | | 74/89.36 |
| 5,253,949 A | * | 10/1993 | Oxley | ...................... B62D 1/16 |
| | | | | 403/155 |
| 5,353,667 A | * | 10/1994 | Wilner | .................. B25B 15/007 |
| | | | | 81/436 |
| 6,568,894 B2 | * | 5/2003 | Golden | ................... F16B 21/12 |
| | | | | 411/349 |
| 6,779,940 B2 | * | 8/2004 | Amrhein | ............. F15B 15/1423 |
| | | | | 403/113 |

* cited by examiner

CAPTIVE BOLT AND RETAINER

FIELD

This disclosure is related to fasteners and more particularly to retention devices.

BACKGROUND

A bolt is a type of fastener that is inserted through a pre-existing hole in material. A bolt is typically threaded and is secured with a threaded nut. There are bolts that use force-fit nuts, which do not require threads. A washer is a thin plate (typically disk-shaped) with a hole (typically in the middle) that is normally used to distribute the load of a threaded fastener, such as a screw or nut.

When mechanical components are fastened together, using a bolt, washer, and nut, the washer and bolt remain in place during placement and turning of the nut. Keeping these parts in place by hand can be time consuming and difficult, especially in confined spaces.

SUMMARY

In at least some embodiments, a retainer for using with a bolt includes a first end having a predetermined shape configured to be inserted within a recess in a first end of the bolt. The retainer also includes a second end configured to couple about a second end of the bolt.

In at least some embodiments, a bolt is configured to engage a retainer and includes a first end, a second end opposite the first end, and a recess having a predetermined shape defined in the first end of the bolt. The recess in the bolt is configured to receive a first end of the retainer.

A fastener system according to at least some embodiments includes a bolt and a retainer. The bolt has a first end and an opposing second end, wherein a recess having a predetermined shape is defined in the first end of the bolt. The retainer is configured to couple to the bolt. The retainer includes a first end having a predetermined shape configured to be inserted within the recess in the first end of a bolt and a second end configured to couple about the second end of the bolt.

A method of joining at least two parts according to at least some embodiments includes inserting a bolt into a pre-existing opening through at least one of the two parts. The bolt includes a first end, a second end opposite the first end, and a recess having a pre-determined shape defined in the first end of the bolt. The method also includes inserting a first end of a retainer into the recess of the bolt, the first end of the retainer including a predetermined shape to be inserted within the recess of the first end of the bolt. The method further includes deflecting and/or rotating the retainer in a direction to bring the second end of the retainer into proximity with the second end of the bolt. The method also includes securing a nut to the bolt.

DETAILED DESCRIPTION

Figure 1:
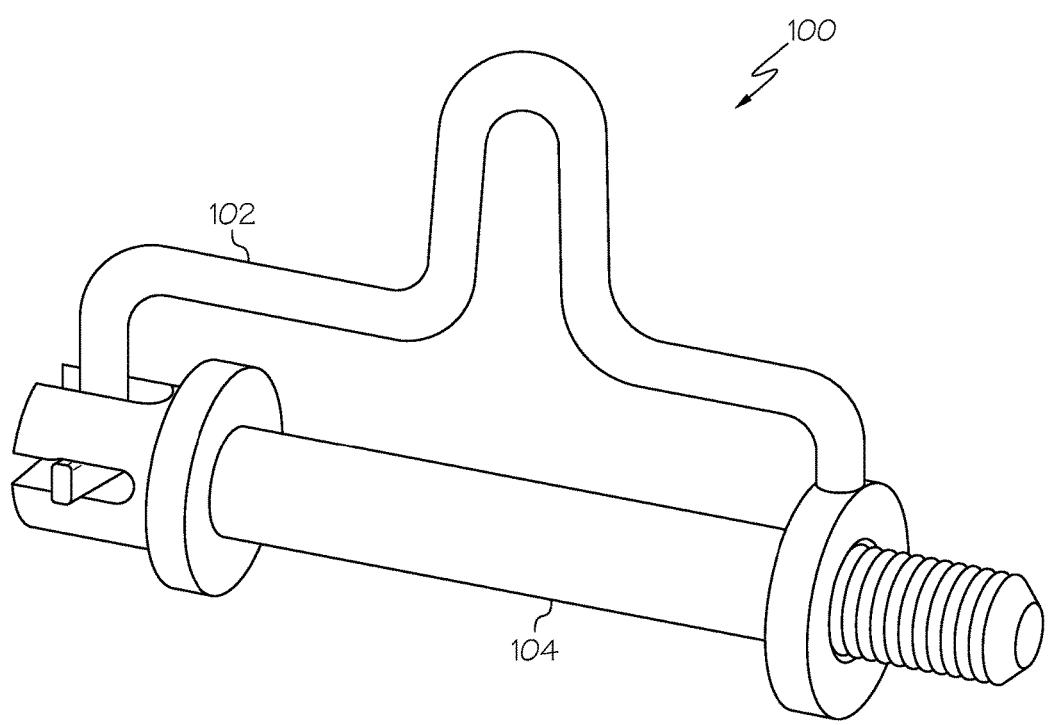
FIG. 1 illustrates a fastening system according to an example embodiment.

Embodiments described herein provide a bolt that can engage with a retainer. A fastening system(s) described herein include a bolt and a retainer. The bolt has a first end and an opposing second end, wherein a recess having a predetermined shape is defined in the first end of the bolt. The retainer is configured to couple to the bolt. The retainer includes a first end having a predetermined shape configured to be inserted within the recess in the first end of a bolt and a second end configured to couple about the second end of the bolt.

The system of the bolt and retainer keeps the bolt and a washer or washer-like coupling of the retainer captive until a nut or other fastening device can be securely installed on the bolt, eliminating the need to keep the parts in place by hand or with extra tools. The system may also advantageously prevent or restrict the bolt from turning during installation of a nut.

This detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

FIG. 1 is an illustration of a fastening system according to an example embodiment. System 100 includes retainer 102 and bolt 104. The bolt pictured in FIG. 1 and the other figures herein is of the threaded type, on which a nut is threaded to secure the bolt in place. However, a threaded bolt is shown as an example only. Since the retainer engages with a recess in what would typically be called the head end of the bolt, the fastening mechanism where the nut would normally be placed on a threaded bolt is largely irrelevant to the herein-described embodiments. Some bolts are made with a post, scored or otherwise, where a press-fit nut is installed. Some bolts are also designed with a hole that accepts a pin to secure the bolt. Any of these various types of bolts can be used with any of various embodiments.

Figure 2:
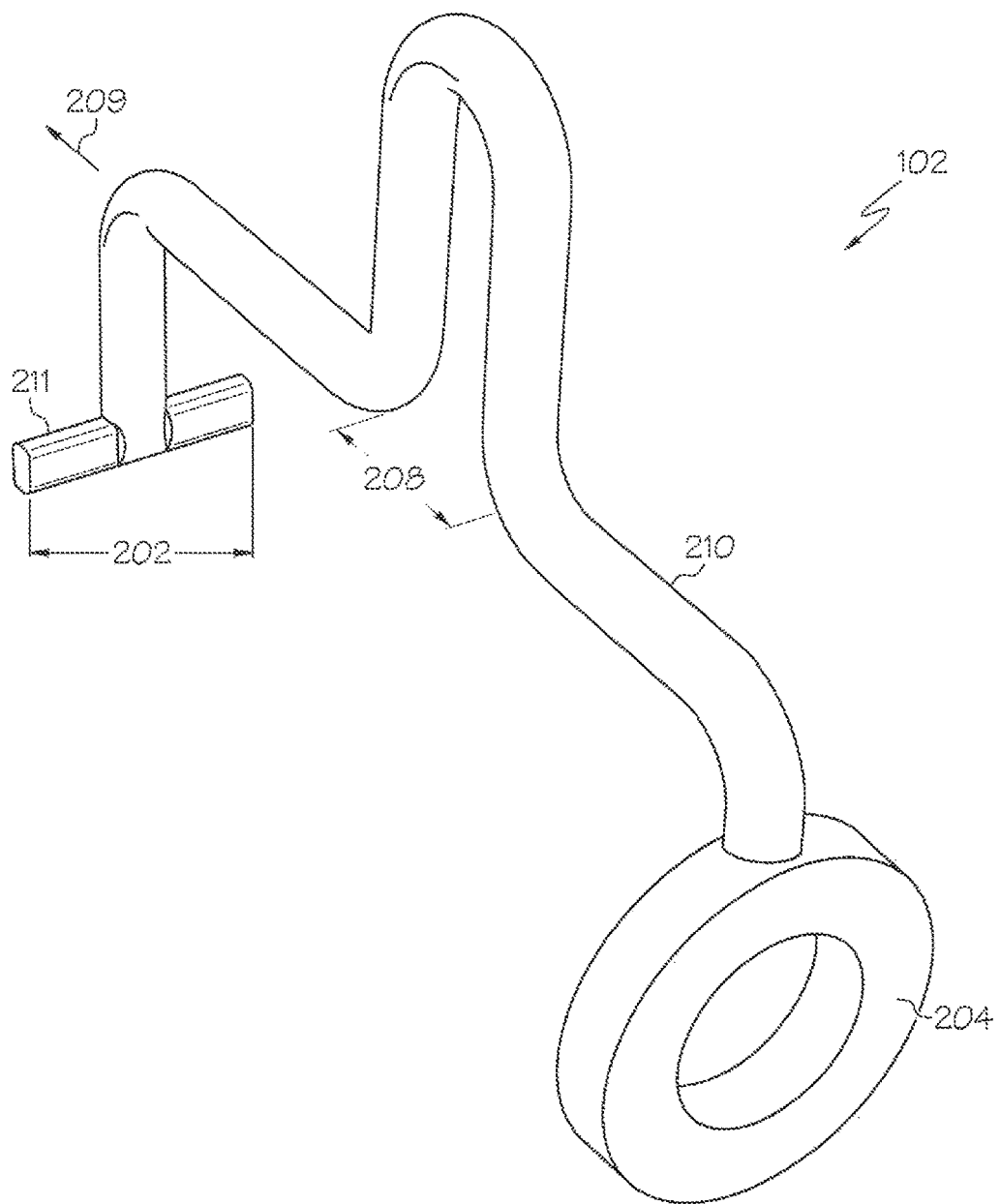
FIG. 2 illustrates the retainer of the fastening system of FIG. 1.

FIG. 2 is an illustration of retainer 102. In FIG. 2, the various details of the retainer's construction can be readily seen. Retainer 102 includes a first end 202 having a predetermined shape configured to be inserted within a recess in a first end of the bolt 104 of the fastening system 100. The retainer 102 also includes a second end 204 configured to couple about a second end of the bolt 104. Retainer 102 further includes a displaced region 208 to enable temporary deflection of the retainer 102 from a relaxed state to a tension state. In this particular example, displaced region 208 is only displaced in one axis, and therefore is substantially parallel to a dominant axis 209 of the body 210 of the retainer 102 in at least one dimension.

Still referring to FIG. 2, the first end 202 of the retainer 102 includes a bar 211 having a predetermined shape to at least partially define the predetermined shape of the first end 202 of the retainer 102. In this example embodiment, bar 211 is at least partially flattened to slide into the first end of the bolt. It should be noted that the entire retainer and/or any of its various parts can be made of various materials. For example, the entire retainer can be made of spring steel. Alternatively, the entire retainer can be made of a polymer such as nylon. The predetermined shape of second end 204 can be made in various shapes, including that of a standard washer, a shape with a rim or flange, or groves or another mechanism to create a so-called "lock washer." Second end 204 of retainer 102 can also be made as a split washer. The entire retainer can be extruded, machined, forged, or molded as a single piece, or the various pieces such as the washer shape and/or bar can be separate parts welded or soldered together, or joined with adhesive.

Figure 3:
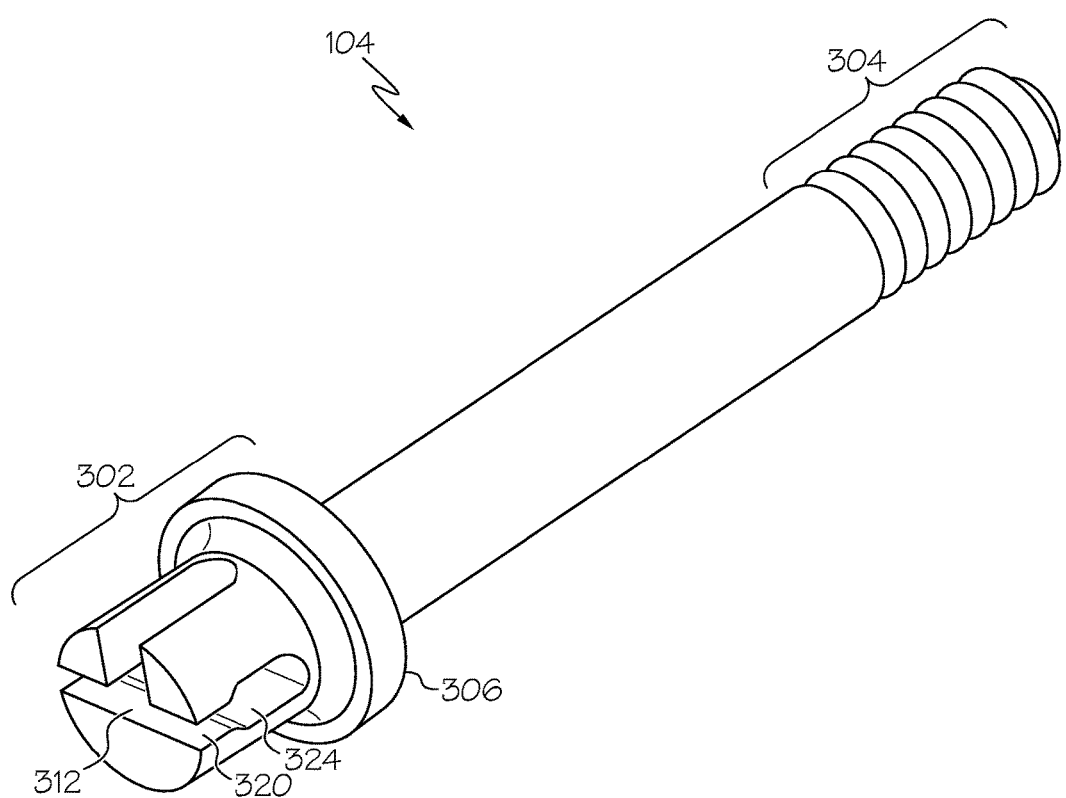
FIG. 3 illustrates the bolt of the fastening system of FIG. 1.

FIG. 3 is an illustration of bolt 104. In FIG. 3, the various details of the bolt's construction can be readily seen. Bolt 104 is configured to engage the retainer 102 of FIG. 2. Bolt 104 includes a first end 302 and a second end 304 opposite the first end 302. The first end 302 includes a lip 306, which in use typically rests on a part with a hole through which the bolt is inserted. First end 302 of bolt 104 also includes a recess 312 with a predetermined shape defined in the first end 302 of bolt 104, wherein recess 312 is configured to receive the first end 202 of the retainer 102. In the example of FIG. 3, the second end 304 of bolt 104 includes threads and is configured to engage the second end 204 of the retainer 102.

Still referring to FIG. 3, the recess 312 in this embodiment includes a flattened slot 320 configured to allow insertion of the first end 202 of the retainer 102, for example either a partially flattened or a round bar. The recess 312 also includes a rounded slot 324 connected to the flattened slot 320 configured to engage the first end 202 of the retainer 102 to allow rotation of the retainer 102 so as to bring the second end 204 of the retainer 102 into proximity with the second end 304 of the bolt 104 after insertion. As previously mentioned, the design of the bolt 104 can vary considerably. As examples, some bolts are made to have a press fit nut installed. Some bolts are also designed with a hole that accepts a pin to secure the bolt. Any of these various types or other types of bolts can be used as bolt 104.

The size of the parts of the fastening system can vary significantly. A system like that shown in FIG. 1 can include a bolt 104 where the threaded part of the body is about 1 inch (25 mm) in diameter. The drawings herein are at least roughly to scale. Larger or smaller bolts and retainers can be used, possibly with adjustment to the material and/or dimensions used to form the retainer 102, since a certain tensile strength is needed to achieve appropriate springback.

Figure 4:
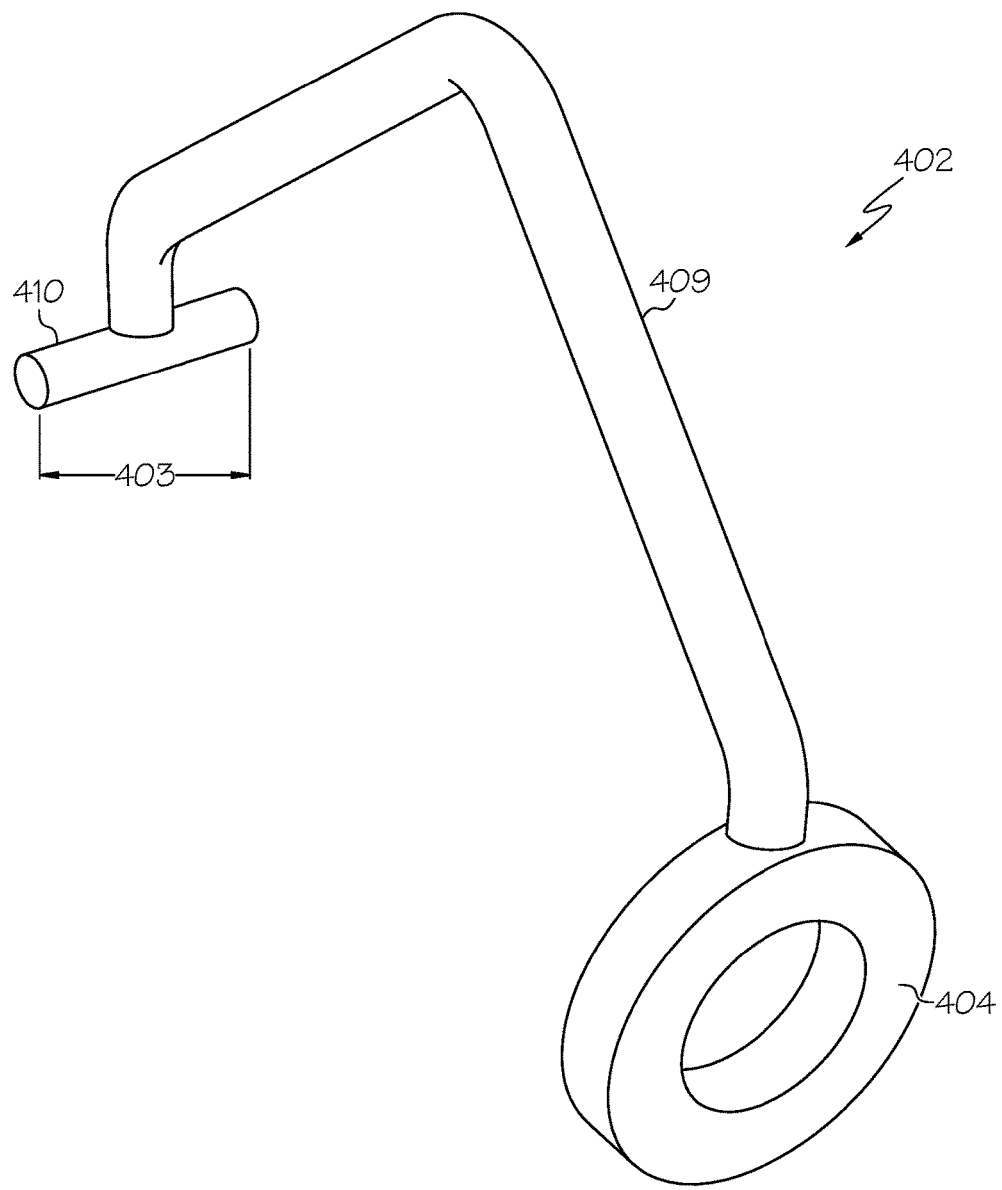
FIG. 4 illustrates a retainer according to additional embodiments.

FIG. 4 is an illustration of retainer 402 according to another embodiment. FIG. 4 shows a variation of the retainer 102 of FIGS. 1 to 3 and only differences will be described in detail below. Retainer 402 includes a first end 403 having a predetermined shape configured to be inserted within a recess in a first end of the bolt of a fastening system, such as bolt 104 (shown in FIG. 3). The retainer 402 also includes a second end 404 configured to couple about a second end of the bolt 104, similar to the configuration of second end 204 (shown in FIGS. 1 and 2). Retainer 402 does not include a displaced region as shown in the retainer of the previous embodiment. Rather, the entire body 409 of the retainer 402 is shaped to allow temporary deflection of the retainer 402 from a relaxed state to a tension state.

In the example of FIG. 4, the first end 403 of the retainer 402 includes a bar 410 having a predetermined shape. In this example embodiment, bar 410 is round to enable the bar 410 to be press fit into the flattened slot 320 in the first end 302 of the bolt 104. The various materials and construction techniques for retainer 402 can be the same as those previously discussed for retainer 102. It should also be noted that the round bar 410 can be used with the retainer 102 of FIG. 2 and the flattened bar 211 (shown in FIG. 2) can be used with the retainer 402 of FIG. 4. It should also be noted that although the retainer described thus far might be considered flexible in that it can be deflected as needed, it is possible to design a fastener system that follows at least most of the principles described herein with a relatively non-flexible retainer. For example, a non-flexible retainer could be used if a recess of a predetermined shape in the first end 302 of bolt 104 were elongated to allow for travel of the end of the retainer that couples about the second end 304 of the bolt 104.

FIG. 5, FIG. 6, FIG. 7, FIG. 8, FIG. 9, and FIG. 10 are illustrations that progressively show at least a portion of a method of fastening parts using the fastening system(s) described herein. The views show installation of the fastening system using the system 100 illustrated in FIG. 1, FIG. 2, and FIG. 3 of this disclosure as an example; however, it should be understood that a method for using retainer 402 with bolt 104 would be similar to the method described below except the whole retainer 402 will deflect rather than deflecting at a displaced region. In the illustrated method of FIGS. 5-10, a linkage 500 is being joined to a spline 502, which is in turn connected to a resolver 504. This application of the fastening system 100 is but an illustrative example.

Figure 5:
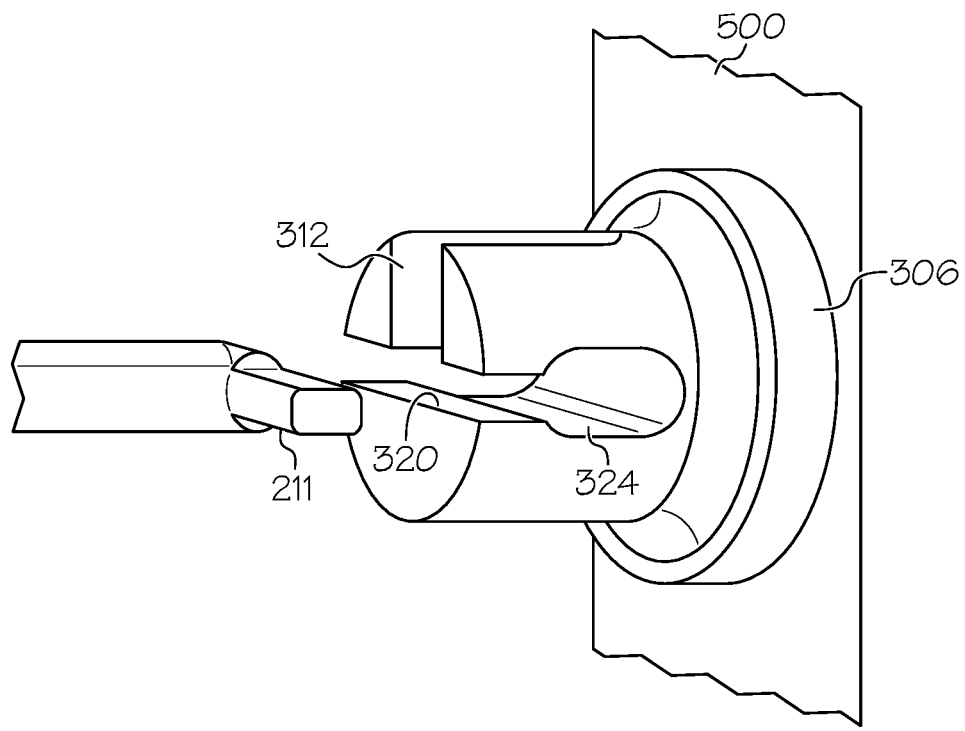
FIG. 5, FIG. 6, FIG. 7, FIG. 8, FIG. 9, and FIG. 10 together illustrate a method of fastening parts together using a fastening system according to the example embodiment of FIGS. 1 to 3.
Figure 6:
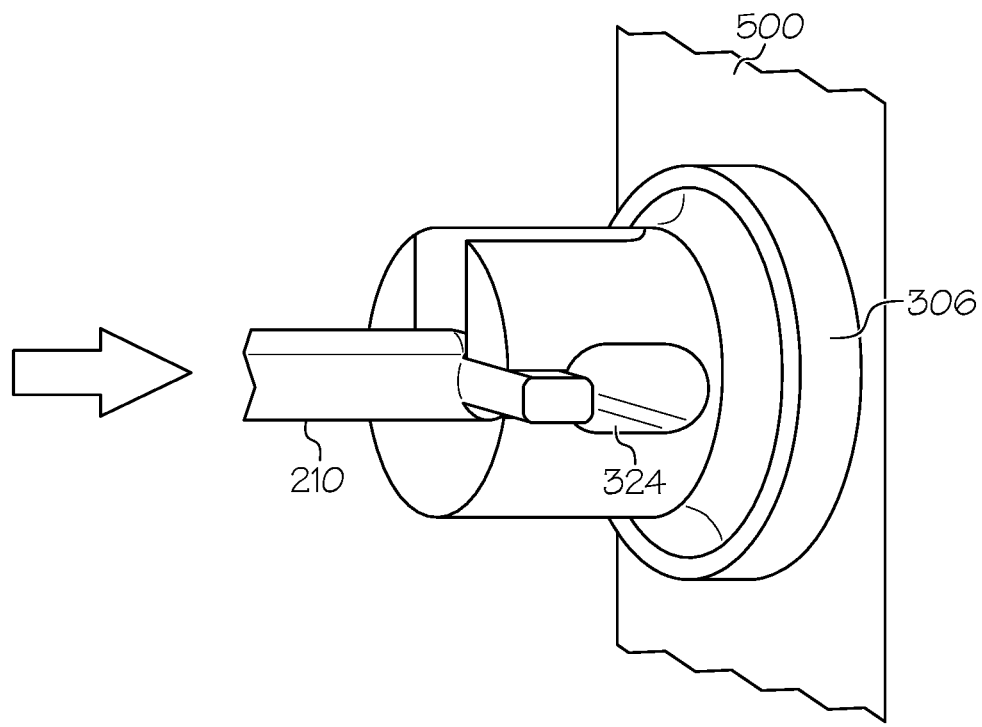
Figure 7:
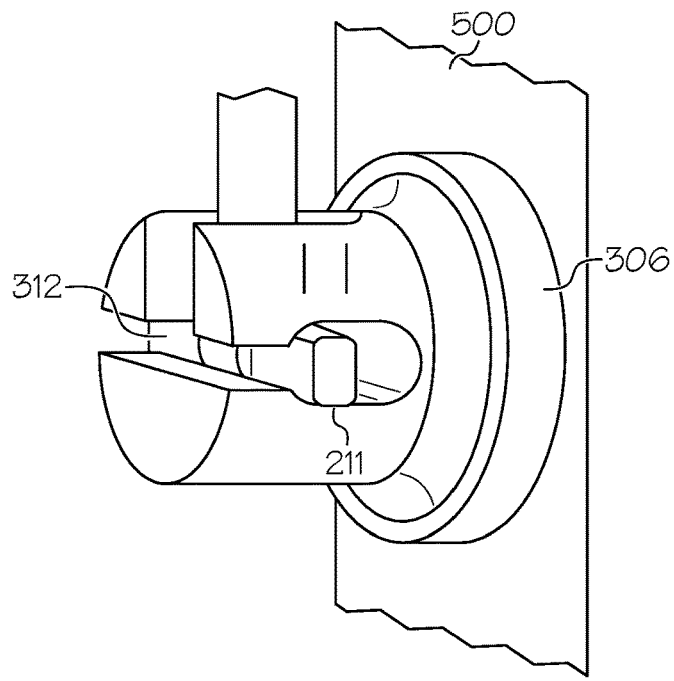

The process of fastening the linkage 500 to the spline 502 begins with the bolt 104 being inserted through an opening in the linkage 500. FIG. 5 illustrates the method where the bolt 104 has just been inserted. In FIG. 6, the first end 202 of the retainer 102, namely the partially flattened bar 211, is inserted into the recess 312 of the bolt 104 by sliding the bar 211 through the flattened slot 320 into the rounded slot 324. In FIG. 7, the bar 211 is resting in the rounded slot 324 and the retainer 102 is moved into position by rotating the retainer 102 in a direction to bring the second end 204 of the retainer 102 into proximity with the second end 304 of the bolt 104. If a retainer with a rounded bar were to be used, it would be inserted into recess 312 of the bolt by press fitting.

Figure 8:
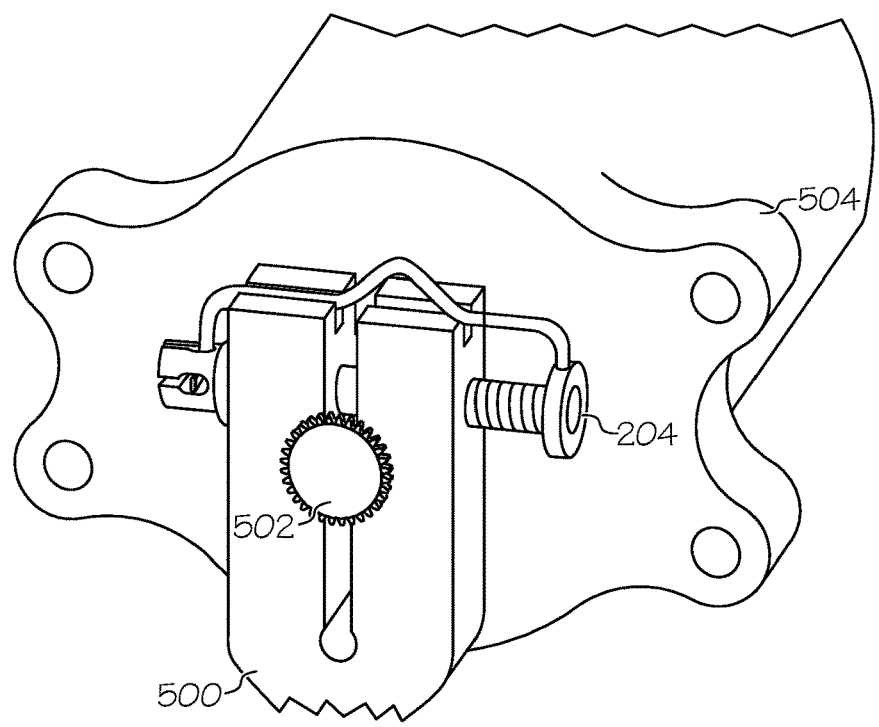
Figure 9:
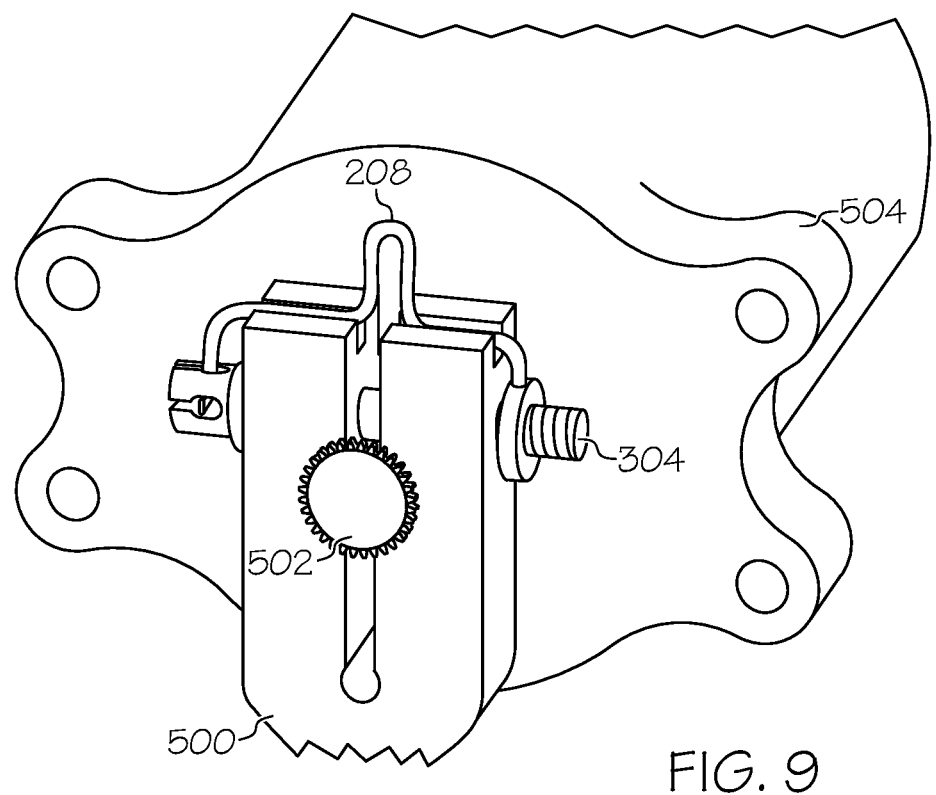
Figure 10:
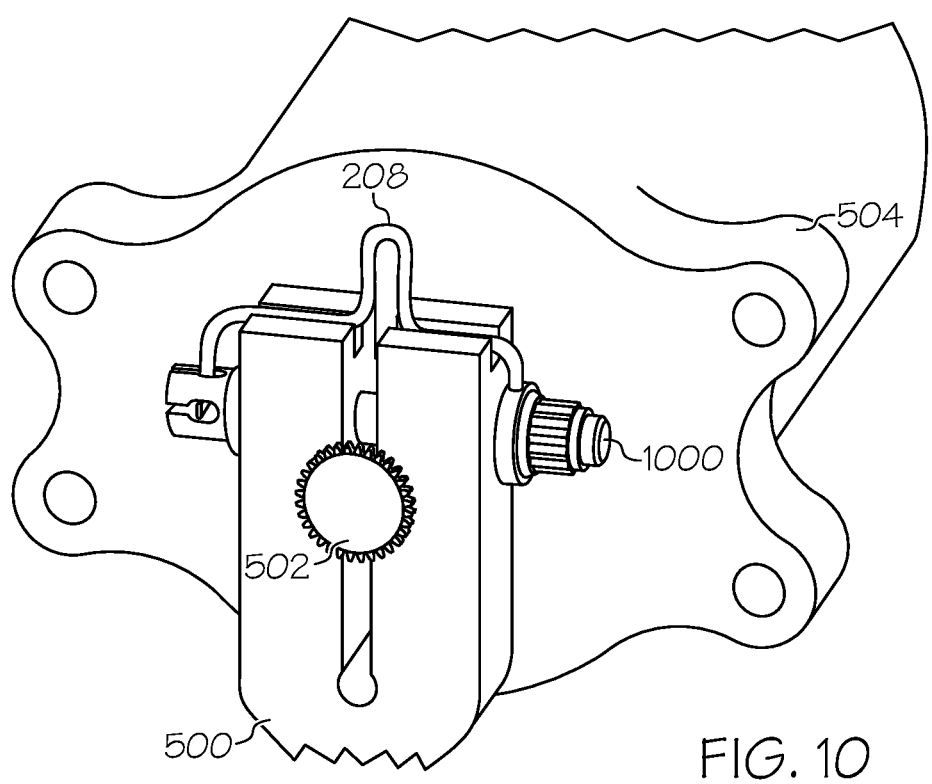

In FIG. 8, the retainer 102 is being temporarily deflected from the relaxed state to the tension state in order to further move the second end 204 of the retainer 102 into position. The displaced region 208 extends along dominate axis 209 to stretch as the retainer 102 is deflected. In this example, the retainer 102 is fully rotated and then deflected; however, these two actions can be combined or reversed in order. In either case, installation of the system 100 involves deflecting and/or rotating the retainer 102 into position. In FIG. 9, the retainer 102 is fully installed and engaged with the bolt 104. The example process is completed by securing nut 1000 to the bolt 104, for example by threading the nut into place, such that the second end 204 of the retainer 102 is positioned between the linkage 500 and the nut 1000 as shown in FIG. 10.

Figure 11:
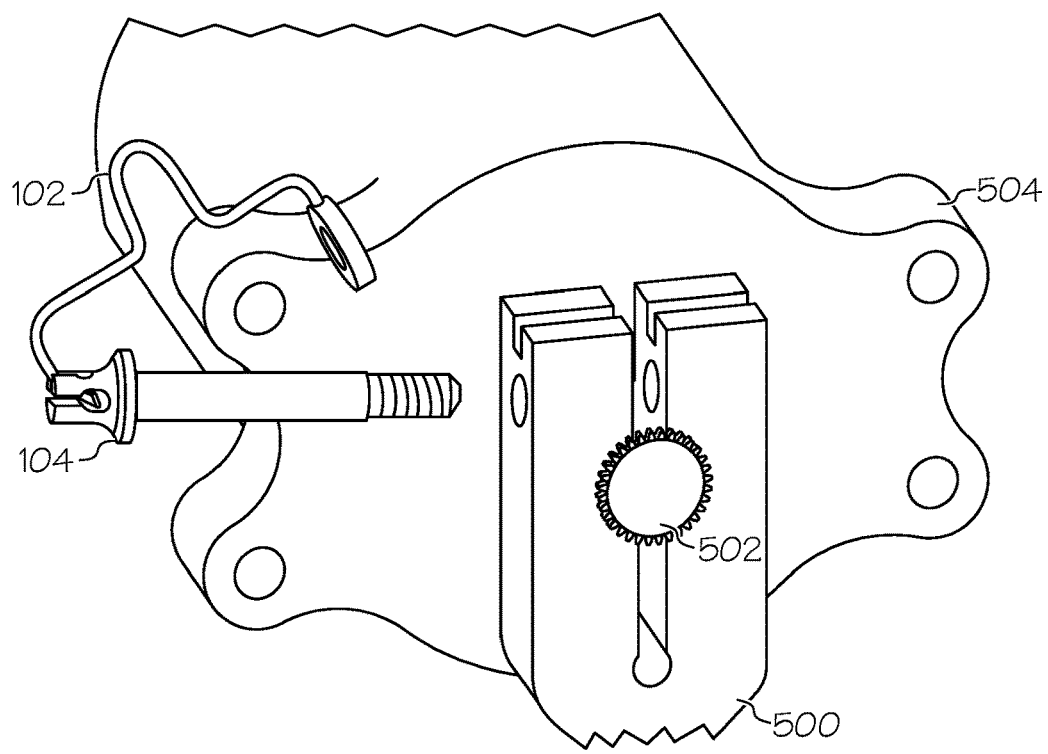
FIG. 11 and FIG. 12 illustrate an alternative method of fastening parts together using the example embodiment of FIGS. 1 to 3.
Figure 12:
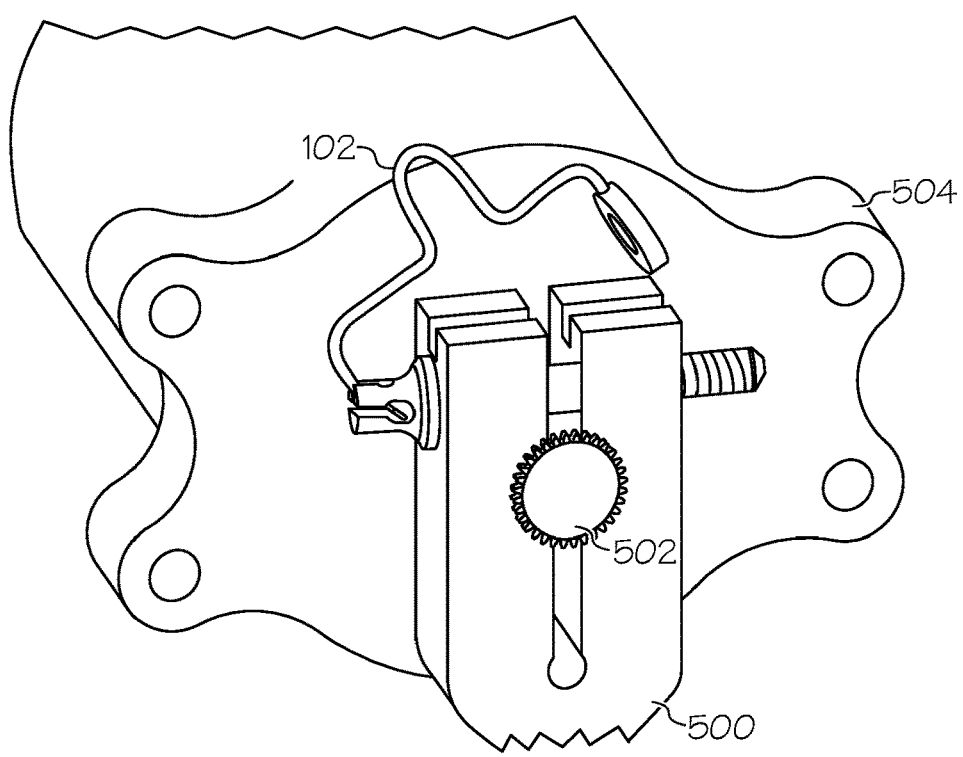

At least some of the various actions of the process discussed above can occur in a different order than that just presented. FIGS. 11 and 12 illustrate an alternative portion of a fastening process where the predetermined shape of the first end 202 of retainer 102 is inserted in the recess 312 in the first end 302 of bolt 104 prior to inserting the bolt 104 into the pre-existing opening in linkage 500. The retainer 102 is then partially rotated as shown in FIG. 11. The bolt 104 is then inserted as shown in FIG. 12. The retainer 102 is further deflected and/or rotated into place.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the various embodiments has been presented for purposes of illustration and description, but is not intended to be exhaustive or limited to embodiments in the form disclosed. Many modifications and variations will be apparent to those of ordinary skill in the art without departing from the scope and spirit of embodiments. The embodiment was chosen and described in order to best explain the principles of embodiments and the practical application, and to enable others of ordinary skill in the art to understand various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the have other applications in other environments. This application is intended to cover any adaptations or variations. The following claims are in no way intended to limit the scope of embodiments to the specifics described herein.

The invention claimed is:

1. A retainer for use with a bolt having a first end and an opposing second end, wherein a recess having a predetermined shape is defined in the first end of the bolt, the retainer comprising:
    a first end comprising a bar having a predetermined shape configured to be inserted within the recess in the first end of the bolt; and
    a second end configured to couple about the second end of the bolt, wherein the bar forms a T-shape at the first end of the retainer.

2. The retainer of claim 1 further comprising a displaced region to enable temporary deflection of the retainer from a relaxed state to a tension state.

3. The retainer of claim 2 wherein the displaced region is substantially parallel to an axis of the retainer in at least one dimension of the retainer.

4. A bolt configured to engage a retainer having a first end having a predetermined shape and a second end configured to couple about the bolt, the bolt comprising:
    a first end;
    a second end opposite the first end; and
    a recess having a predetermined shape defined in the first end of the bolt, wherein the recess includes an opening that is codirectional with a longitudinal axis of the bolt and is configured to receive the first end of the retainer; and
    a channel extending from the recess, the channel including an opening extending radially from the longitudinal axis of the bolt in the first end of the bolt and including a length dimension extending parallel to the longitudinal axis of the bolt, the channel being configured to allow rotation of the retainer with the predetermined shape of the first end of the retainer inserted into the recess, so as to bring the second end of the retainer into proximity with the second end of the bolt.

5. The bolt of claim 4 wherein the second end further comprises threads and is configured to engage the second end of the retainer.

6. The bolt of claim 4 wherein the recess defined in the first end comprises:
    a flattened slot configured to allow insertion of the first end of the retainer; and
    a rounded slot connected to the flattened slot, the rounded slot configured to engage the first end of the retainer to allow rotation of the retainer so as to bring the second end of the retainer into proximity with the second end of the bolt.

7. A fastener system comprising:
    a bolt having a first end and an opposing second end, wherein a recess having a predetermined shape is defined in the first end of the bolt and a channel extends from the recess, the recess including an opening that is codirectional with a longitudinal axis of the bolt; and
    a retainer configured to couple to the bolt, the retainer comprising:
        a first end having a predetermined shape configured to be inserted within the recess in the first end of the bolt; and
        a second end configured to couple about the second end of the bolt, wherein the channel is configured to allow rotation of the retainer with the predetermined shape of the first end of the retainer inserted into the recess, so as to bring the second end of the retainer into proximity with the second end of the bolt.

8. The fastener system of claim 7 wherein:
    the first end of the retainer comprises a bar having the predetermined shape; and
    the first end of the bolt further comprises:
        a flattened slot configured to allow insertion of the bar; and
        a rounded slot connected to the flattened slot configured to engage the bar after insertion to allow rotation of the retainer so as to bring the second end of the retainer into proximity with the second end of the bolt.

9. The fastener system of claim 8 wherein the bar is at least partially flattened to enable the bar to slide through the flattened slot.

10. The fastener system of claim 8 wherein the bar is round to enable the bar to be press fit into the flattened slot.

11. The fastener system of claim 7 wherein the retainer comprises spring steel or a polymer.

12. The fastener system of claim 7 wherein the second end of the bolt comprises threads.

13. The fastener system of claim 7 wherein the retainer further comprises a displaced region to enable temporary deflection of the retainer from a relaxed state to a tension state.

14. The fastener system of claim 13 wherein the displaced region is substantially parallel to an axis of the retainer in at least one dimension.

15. A method of joining at least two parts, the method comprising:
    inserting a bolt into a pre-existing opening through at least one of the two parts, the bolt including a first end, a second end opposite the first end, and a recess having a pre-determined shape defined in the first end of the bolt;
    inserting a first end of a retainer into the recess of the bolt, the first end of the retainer including a bar having a predetermined shape configured to be inserted within the recess of the first end of the bolt, wherein the bar forms a T-shape at the first end of the retainer;

deflecting and/or rotating the retainer in a direction to bring a second end of the retainer into proximity with the second end of the bolt; and securing a nut to the bolt such that the second end of the retainer is positioned between at least one of the parts and the nut.

16. The method of claim 15 wherein the second end of the bolt comprises threads, and securing of the nut to the bolt further comprises threading the nut onto the threads.

17. The method of claim 15 wherein the recess of the bolt is at least partially defined by a slot, the inserting of the first end of a retainer into the recess of the bolt further comprising at least one of sliding and press fitting the bar into the slot.

18. The method of claim 17 wherein the bar is at least partially flattened and the inserting of the first end of the retainer into the recess comprises sliding the bar into the slot.

19. The method of claim 17 wherein the bar is round and the inserting of the first end of the retainer into the recess comprises press fitting the bar into the slot.

20. The method of claim 15 wherein the deflecting and/or rotating of the retainer further comprising deflecting at least a portion of a displaced region.

21. A fastener system comprising:
a bolt having a first end and an opposing second end, wherein a recess having a predetermined shape is defined in the first end of the bolt; and
a retainer configured to couple to the bolt, the retainer comprising:
a first end having a predetermined shape configured to be inserted within the recess in the first end of the bolt;
a second end configured to couple about the second end of the bolt, wherein:
the first end of the retainer comprises a bar having the predetermined shape; and
the first end of the bolt further comprises:
a flattened slot configured to allow insertion of the bar; and
a rounded slot connected to the flattened slot configured to engage the bar after insertion to allow rotation of the retainer so as to bring the second end of the retainer into proximity with the second end of the bolt.

22. The fastener system of claim 21 wherein the bar is at least partially flattened to enable the bar to slide through the flattened slot.

23. The fastener system of claim 21 wherein the bar is round to enable the bar to be press fit into the flattened slot.

24. The fastener system of claim 21 wherein the retainer comprises spring steel or a polymer.

25. The fastener system of claim 21 wherein the retainer further comprises a displaced region to enable temporary deflection of the retainer from a relaxed state to a tension state.

26. The fastener system of claim 25 wherein the displaced region is substantially parallel to an axis of the retainer in at least one dimension.

* * * * *